United States Patent
Turner (10) Patent No.: US 10,059,044 B2
(45) Date of Patent: Aug. 28, 2018

(54) METHODS OF FORMING COMPOSITE STRUCTURES AND METHODS OF FORMING MATERIAL WITH A REMOVABLE BACKING FOR COMPOSITE STRUCTURES

(71) Applicant: Orbital ATK, Inc., Dulles, VA (US)

(72) Inventor: Peter G. Turner, Eden, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 5 days.

(21) Appl. No.: 14/679,341

(22) Filed: Apr. 6, 2015

(65) Prior Publication Data
US 2015/0209983 A1     Jul. 30, 2015

Related U.S. Application Data (62) Division of application No. 12/701,126, filed on Feb. 5, 2010, now Pat. No. 8,999,098.

(51) Int. Cl.
*C08J 5/24* (2006.01)
*B32B 37/00* (2006.01)
(Continued)

(52) U.S. Cl.
CPC .......... *B29C 43/28* (2013.01); *B29C 37/0075* (2013.01); *B29C 70/30* (2013.01); *B29C 70/342* (2013.01); *B32B 37/003* (2013.01); *C08J 5/24* (2013.01); *B29C 35/02* (2013.01); *B29C 59/10* (2013.01); *B29C 66/028* (2013.01);
(Continued)

(58) Field of Classification Search
CPC ......... Y10T 156/1028; Y10T 156/1077; Y10T 156/1092; Y10T 156/1093; Y10T 156/1075; Y10T 156/1062; Y10T 156/1026; B32B 38/1875; B32B 38/1858; B32B 38/1825; B32B 38/0008; B32B 38/1808; B32B 2038/042; B32B 2038/045; B32B 2038/0028; B32B 2038/0072;
(Continued)

(56) References Cited

U.S. PATENT DOCUMENTS 1,351,374 A * 8/1920 Crowell ................. D21F 11/00
                                                                                           162/108
3,278,100 A    10/1966   Hornberger
(Continued)

FOREIGN PATENT DOCUMENTS

JP       354159476 A     12/1979
JP       02153938 A      6/1990
(Continued)

OTHER PUBLICATIONS

Accudyne Systems, Inc. "Three New Composite Machines". [online] [retrieved on Mar. 23, 2010] retrieved at <http://accudyne.com/>.

(Continued)

*Primary Examiner* — Linda L Gray
(74) *Attorney, Agent, or Firm* — TraskBritt (57) ABSTRACT

A method of preparing pre-impregnated (pre-preg) material is provided. The method comprises treating a first surface of a backing with a corona discharge to enhance surface adhesion and applying the pre-preg material to the treated surface of the backing to form a pre-preg material with backing.

19 Claims, 5 Drawing Sheets

(51) Int. Cl.
| | |
|---|---|
| *B32B 38/04* | (2006.01) |
| *B29C 37/00* | (2006.01) |
| *B29C 70/30* | (2006.01) |
| *B29C 70/34* | (2006.01) |
| *B29C 43/28* | (2006.01) |
| *B29C 35/02* | (2006.01) |
| *B29C 59/10* | (2006.01) |
| *B29C 65/00* | (2006.01) |
| *B29C 70/32* | (2006.01) |
| *B32B 38/00* | (2006.01) |
| *B32B 37/10* | (2006.01) |

(52) U.S. Cl.
CPC ............ *B29C 66/721* (2013.01); *B29C 70/32* (2013.01); *B32B 38/0008* (2013.01); *B32B 2037/109* (2013.01); *B32B 2305/076* (2013.01); *B32B 2309/68* (2013.01); *B32B 2310/14* (2013.01); *Y10T 156/108* (2015.01); *Y10T 156/1028* (2015.01); *Y10T 156/1066* (2015.01); *Y10T 156/1075* (2015.01); *Y10T 156/1077* (2015.01); *Y10T 156/1079* (2015.01); *Y10T 156/1092* (2015.01); *Y10T 156/1097* (2015.01)

(58) Field of Classification Search
CPC ....... B29C 70/38; B29C 70/30; B29C 66/028; B29C 66/721
See application file for complete search history.

(56) References Cited

U.S. PATENT DOCUMENTS

| | | | | |
|---|---|---|---|---|
| 4,215,516 | A | * | 8/1980 | Huschle ................ B24D 11/06 156/304.3 |
| 4,402,888 | A | | 9/1983 | Runck |
| 4,460,531 | A | | 7/1984 | Harris et al. |
| 4,491,493 | A | * | 1/1985 | Eaton ................... B29C 70/386 156/235 |
| 4,548,770 | A | | 10/1985 | Holland et al. |
| 4,588,466 | A | * | 5/1986 | Eaton ................... B29C 70/386 156/235 |
| 4,591,402 | A | | 5/1986 | Evans et al. |
| 4,929,319 | A | | 5/1990 | Dinter et al. |
| 5,024,862 | A | | 6/1991 | Frank et al. |
| 5,173,138 | A | | 12/1992 | Blauch et al. |
| 5,351,111 | A | | 9/1994 | Takafuji et al. |
| 5,413,815 | A | | 5/1995 | Williams et al. |
| 5,685,416 | A | | 11/1997 | Bonnet |
| 5,795,426 | A | | 8/1998 | Jackson et al. |
| 6,050,517 | A | | 4/2000 | Dobrescu et al. |
| 6,073,670 | A | | 6/2000 | Koury |
| 6,176,957 | B1 | * | 1/2001 | Bolitsky ................. B27D 1/10 156/230 |
| 7,086,627 | B2 | | 8/2006 | Kehler et al. |
| 7,540,447 | B2 | | 6/2009 | Shiraishi et al. |
| 8,282,757 | B2 | | 10/2012 | Madsen et al. |
| 2001/0015317 | A1 | | 8/2001 | Kawabe |
| 2003/0199337 | A1 | | 10/2003 | Hebert et al. |
| 2004/0026025 | A1 | | 2/2004 | Sana et al. |
| 2004/0098852 | A1 | | 5/2004 | Nelson |
| 2006/0003133 | A1 | | 1/2006 | Johnson |
| 2007/0017628 | A1 | | 1/2007 | Evans |
| 2009/0301642 | A1 | | 12/2009 | Patel et al. |
| 2011/0192535 | A1 | | 8/2011 | Slack et al. |
| 2011/0247743 | A1 | | 10/2011 | Turner |

FOREIGN PATENT DOCUMENTS

| | | |
|---|---|---|
| JP | 06024615 A | 2/1994 |
| JP | 11180607 A | 7/1999 |
| JP | 2001213557 A | 8/2001 |
| JP | 2004181683 | 7/2004 |
| JP | 2004314565 A | 11/2004 |

OTHER PUBLICATIONS

European Communication: Partial European Search Report for European Patent Application EP10189022.6, dated Aug. 18, 2011.
Japanese Decision of Rejection for Japanese Patent Application No. 2010-266467 dated Jul. 29, 2013, 5 pages.
Translation of Office Action from Japanese Patent Application No. 2010-266467, dated Oct. 24, 2012, 4 pages.
Strobel, Market AL., A Comparison of Corona-Treated and Flame-Treated Polypropylene Films. Plasmas and Polymers vol. 8, No. 1 (Mar. 2003), pp. 61-95.
Zander, Nicole et al., Oxidation of Polyethylene: A Comparison of Plasma and Ultraviolet Ozone Processing Techniques. Army Research Laboratory, Aberdeen Proving Ground, MD 21005-5069, ARL-TR-4701 (Jan. 2009), 21 pages.

* cited by examiner

METHODS OF FORMING COMPOSITE STRUCTURES AND METHODS OF FORMING MATERIAL WITH A REMOVABLE BACKING FOR COMPOSITE STRUCTURES

CROSS-REFERENCE TO RELATED APPLICATION

This application is a divisional of U.S. patent application Ser. No. 12/701,126, filed Feb. 5, 2010, now U.S. Pat. No. 8,999,098, issued Apr. 7, 2015, the disclosure of which is hereby incorporated herein in its entirety by this reference.

BACKGROUND

Pre-impregnated (pre-preg) material is used in the formation of high-strength low-weight structures, such as, but not limited to, parts used to build aircraft and spacecraft. Pre-preg material is made of composite fibers such as carbon, glass, aramid and the like, that are bonded together with a resin that is activated with heat to cure. The pre-preg material is typically formed in sheets that are supplied to the manufacturer of the part. The manufacturer then forms stacks of sheets of pre-preg material in a desired shape of the part and heats the part in an autoclave to cure the resin. Sheets of pre-preg material are typically supplied in a 0 degree or a 90 degree orientation. That is, the length of the fibers are typically either orientated parallel to a side edge of the sheet or orientated perpendicular to a side edge of the sheet. Some applications require the sheets of pre-preg material having different orientation.

For the reasons stated above and for other reasons stated below that will become apparent to those skilled in the art upon reading and understanding the present specification, there is a need in the art for an efficient, effective and cost effect method of providing a layer pre-preg material having different orientations.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of preparing pre-impregnated (pre-preg) material is provided. The method comprises treating a first surface of a backing with a corona discharge to enhance surface adhesion and applying the pre-preg material to the treated surface of the backing to form a pre-preg material with backing.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the text.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a method of preparing and creating sheets of pre-preg material of select orientations using a corona discharge on a backing material to prepare the backing so the pre-preg material sticks to the backing. Although, this technique works well for various types of backing material such as semi-ridged paper, it also works well for pliable inexpensive polyethylene (PE) backing. The use of a flexible (pliable) backing such as PE is desirable for some applications where the pre-preg is pressed onto a tool with the backing on. This is especially true when applying the pre-preg material around a corner of the tool where the fibers are stretched on the tool to cover the corner. In this situation, the backing also needs to stretch. The use of a paper backing in forming complex shapes can lead to wrinkling or tearing of the backing instead of stretching. As a result, the pre-preg material will fold with the paper or split apart between fibers across the paper tear. Paper backing also allows bridging to occur in concave regions especially if they are adjacent to flat or convex surfaces.

Figure 2:
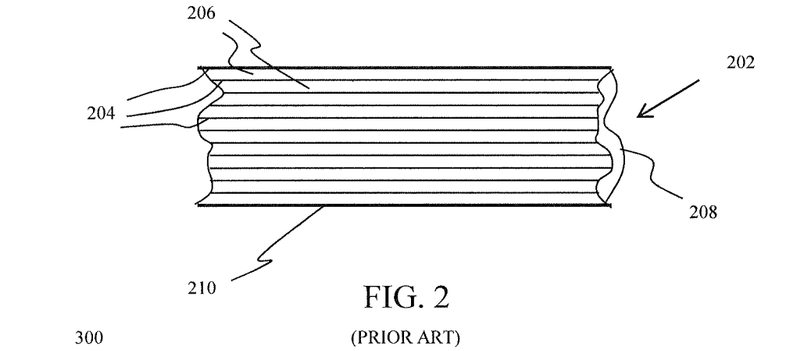
FIG. 2 is a top view illustration of a pre-preg material of the prior art.
Figure 3A:
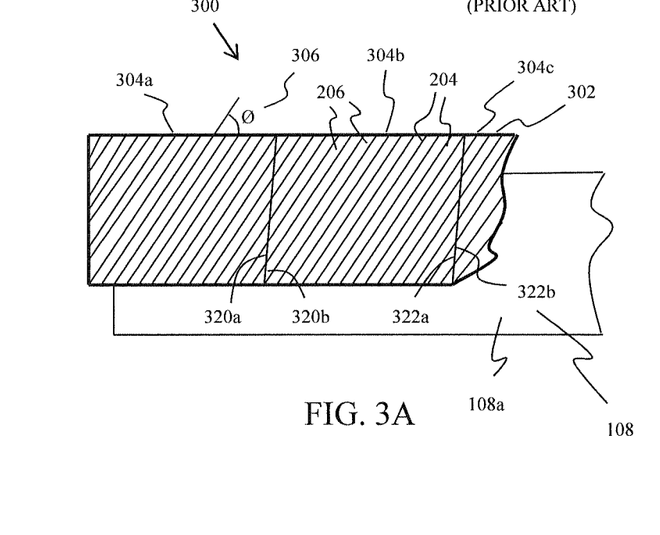
FIG. 3A is a top view illustration of the forming of the pre-preg material of an embodiment of the present invention.

One type of backing material commonly used for pre-preg material is a semi-rigid paper. Paper is a common backing used by pre-preg material suppliers because the pre-preg material sticks well to it. An example of a pre-preg material 202 on a paper backing 208 is illustrated in FIG. 2. In this example, the pre-preg material 202 includes fibers 204 held together with resin 206. In this example, the fibers 204 are orientated at a 0 degree angle in relation to a side 210 of the backing material 202. This 0 degree orientation is a common orientation of pre-preg material provided by pre-preg material suppliers. Pre-preg material supplied by the material supplier can generally be referred to as feedstock. The spacing between the fibers 204 and resin 206 throughout FIGS. 2 and 3A are provided merely for illustration purposes of orientations. Moreover, the pre-preg material 202 and 300 in FIGS. 2 and 3A are illustrated as having one layer of fibers orientated in one direction (uni-tape). However, the embodiments also include woven fabric pre-preg material known in the art.

It is often desired to use pre-preg material having different fiber orientations than is provided by the manufacture. Referring to FIG. 3A, an example of pre-preg material 300 having a desired orientation is provided. In particular, in this embodiment, sections 304a through 304c of pre-preg material 300 from the material supplier are cut out at a desired angle. The sections 304a through 304c are then lined up end to end 320a to 320b and 322a to 322b and connected together so the fibers 204 have a select angle 306 (orientation) in relation to a side edge 302 of pre-preg material 300. One method of connecting the section together is with a tape. The sections are then placed on a new backing 108. As discussed above, it may be desirable to press the pre-preg material on a tool for forming with the backing material still attached to the pre-preg material. In embodiments, the pre-preg material 300 with the select orientation 306 is placed on a pliable backing 108. However, pre-preg material 300 will not stick well enough to the pliable backing 108 to prevent it from falling off during forming and handling. Hence, in embodiments, the pre-preg material 300 is placed on a backing 108 surface that has been treated with a corona discharge to promote more adhesion.

Figure 1:
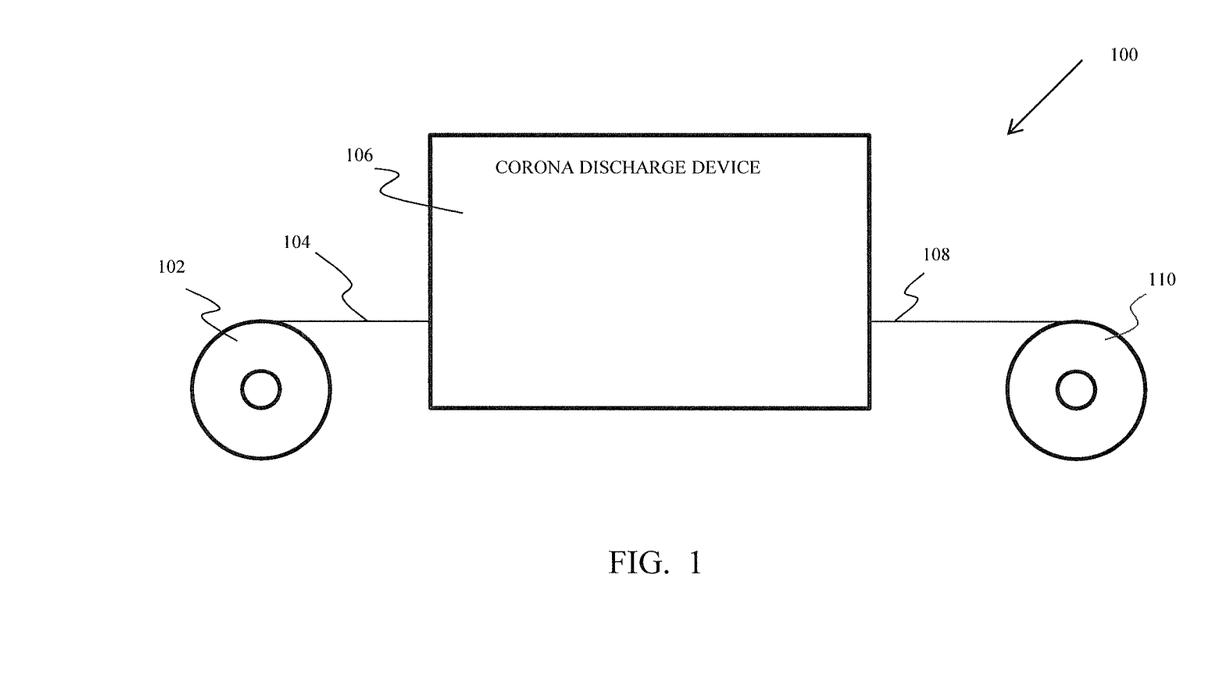
FIG. 1 is a side view of a corona discharge system of one embodiment of the present invention.

Referring to FIG. 1, a corona discharge system 100 of one embodiment is illustrated. With the corona discharge system 100, backing 104 from a roll 102 of backing 104 is passed through a corona discharge device 106 to treat one surface of the backing 104. The corona discharge device 106 exposes the one surface of the backing 104 to an electrical discharge (corona). As a result, oxygen molecules within the electrical discharge area break into their atomic form and are free to bond to the ends of molecules in the backing material. This results in a chemically activated surface that increases surface tension. The treated backing 108 is then rolled up into roll 110 and is ready for use. As discussed above, the backing material in one embodiment is a pliable backing material such as polyethylene (PE). However, the present invention is not limited to PE backing material. In fact, most all types of backing material for pre-preg material can benefit from a corona discharge treatment to enhance bonding of the pre-preg material on the backing. In one embodiment of a PE backing example, a 0.002 inch (2 mil) thick linear low density polyethylene LLDPE film that is treated to a 38+/2 dyne/cm$^2$ surface energy is used. As discussed above, other types of backing material are contemplated and can benefit from the corona discharge. Different backing material will require different surface energy levels. Moreover, different adhesion levels require different surface energy levels and different thickness of the film used as backing will yield different mechanical behavior in terms of stiffness and conformability. A typical range for a thickness of a backing material would be 0.001 inch to 0.006 inch. Another example type of the elastic material that could be used is polyurethane material. Polyurethane materials are more pliable (elastic) than PE material and offer greater tear resistance and may offer advantages in forming complex shapes. Other types of plastic can be used for backing including, but not limited to, polyester, nylon and fluorinated hydrocarbons. Plasma treating films is another method for increasing surface tension but it tends to burn through thin films.

Figure 3B:
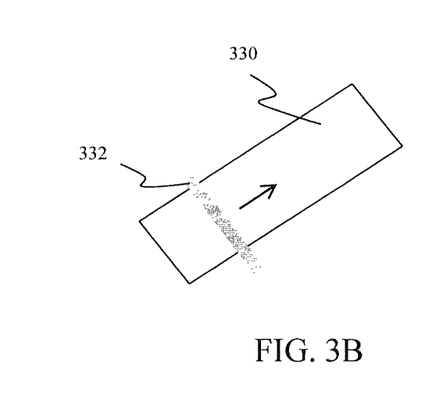
FIG. 3B is a top view of an application of a squeegee on a formed pre-preg material with backing.
Figure 3C:
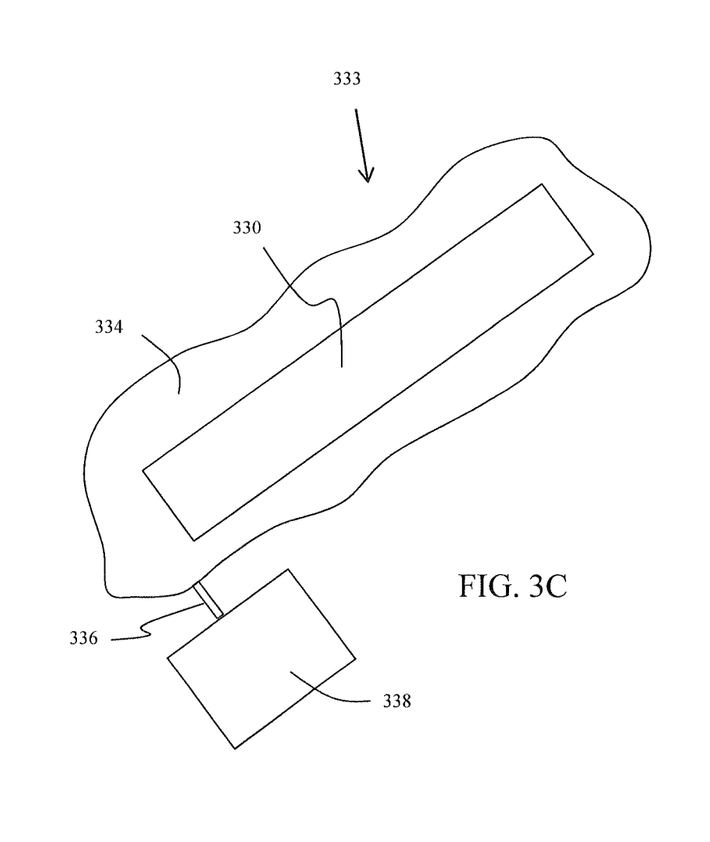
FIG. 3C is a top view of an application of a vacuum debulk system on the formed pre-preg material and backing.
Figure 4:
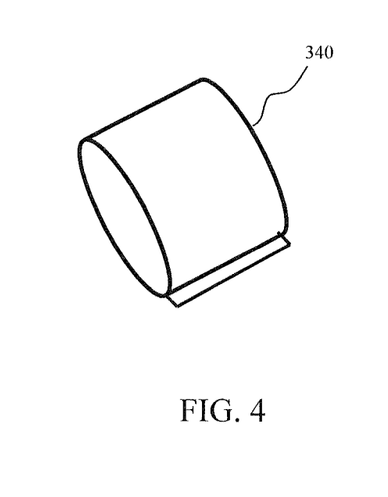
FIG. 4 is a side view of a roll of pre-preg material of an embodiment of the present invention.

Once, one surface 108a of the backing material 108 has been treated, the pre-preg material 300 is placed on the treated surface 108a as illustrated in FIG. 3A. As stated above, the corona discharge treatment on the treated surface 108a of the backing material 108 will adhere to the side edge 302 of the pre-preg material 300. In one embodiment, entrapped air between the pre-preg material 300 and the treated surface 108a of the formed pre-preg material and backing 330 is removed by pushing it out with a squeegee 332 or other wiping method as illustrated in FIG. 3B. This aids in the adhesion between the pre-preg material 300 and the treated surface 108a. In yet another embodiment, a vacuum debulk system 333 is applied to assist pressing the treated surface 108a into intimate contact with the pre-preg material 300 and removing air to aid in the adhesion between the pre-preg material 300 and the treated surface 108a. An example vacuum debulk system 333 is illustrated in FIG. 3C. In FIG. 3C, the formed pre-preg material and backing 330 is placed in a vacuum bag 334 that is connected to a vacuum 338 by a connector 336. In an embodiment that implements a vacuum debulk, the vacuum debulk is applied at room temperature for as short as 5 seconds. In another embodiment, an elevated temperature of about 45° C. is used in the debulking. Generally, longer vacuum time of higher temperatures help improve the immediate tack. However, the advantages of the higher temperature and time dissipate after 24 hours to the same adhesion value. Adhesion is measured in peel strength. Specimens 75 mm wide are prepared and then pulled tested in a 180 degree peel. Preferred values in one embodiment are in the range of 0.3-0.45 kg/cm width (2-3 lbs/3 inch width). Higher values would tend to stick too well and pull the pre-preg material apart upon removal. Lower values tend to be difficult to achieve with corona discharge of non-slip agent grade of PE or tend not to stick as well through the forming process. Once, the pre-preg material 300 is adhered to treated surface 108a, it is ready to be applied to a tool. In one embodiment, once the pre-preg material 300 is adhered to the backing 108 (formed pre-preg material and backing 330) it is rolled up in a roll 340 that can be easily stored or moved to a desired location for use.

Figure 5:
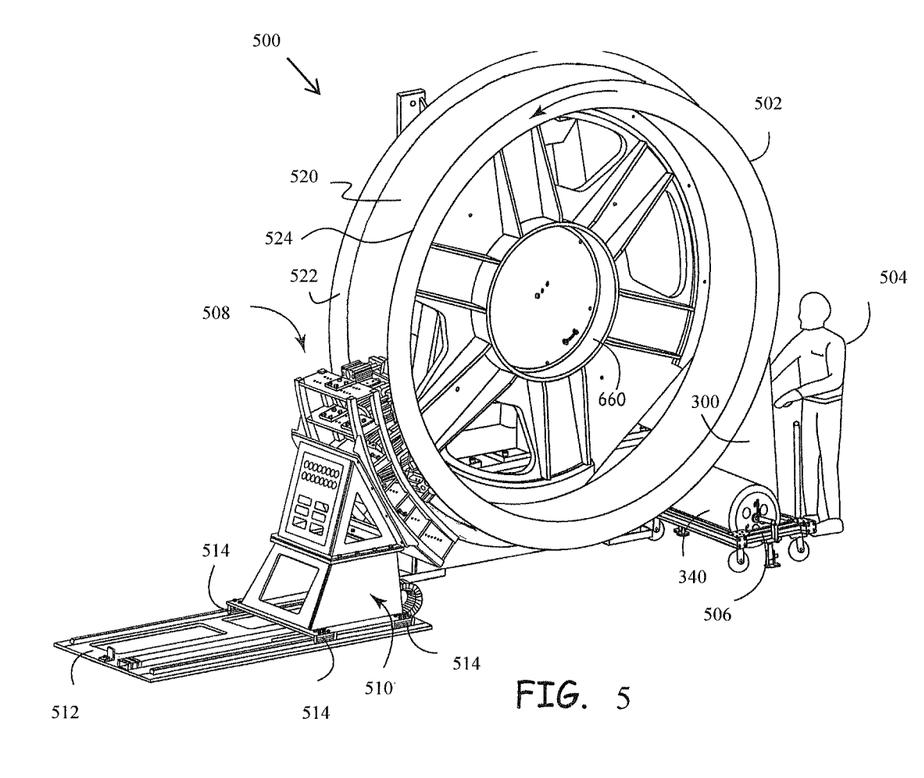
FIG. 5 is a side perspective view of a forming system implementing an embodiment of the present invention.

Referring to FIG. 5, an application of the pre-preg material 300 with the backing 108 treated with corona discharge is illustrated. In particular, FIG. 5 illustrates the pre-preg material 300 being applied by an operator 504 to a tool 502 in forming system 500. The tool 502 in this example rotates about a central hub 660. The tool 502 in this example includes a first forming surface 520 and side forming surfaces 522 and 524 that form a ring shaped composite structure with opposed flanges. As the tool 502 rotates, the operator 504 applies the pre-preg material 300 from the roll 340 on the forming surfaces 520, 522 and 524 of the tool 502. The roll 340 is held by a supply roll holding device 506. Because the backing 108 has been treated with corona discharged (and vacuum debulked in an embodiment) the backing 108 remains on the pre-preg material 300 even though the pre-preg material 300 is initially shaped by the operator to conform to the shape of the forming surfaces 520, 522 and 524 of the tool 502 as it is applied.

A forming head 508 that includes a plurality of rollers is used to press the backing 108 and pre-preg material 300 into the forming surfaces 520, 522 and 524 of the tool 502. Since, the backing 108 in this example is pliable and treated with the corona discharge, the backing 108 moves as the pre-preg material 300 moves. The forming head 508 in this example is supported by a forming head base 510 that slidably engages a base plate 512 via guides 514. An example of a forming head 508 arrangement is provided in commonly assigned U.S. patent application Ser. No. 12/615,908 entitled "Automated Composite Annular Structure Forming," filed on Nov. 10, 2009, now U.S. Pat. No. 8,282,757, issued Oct. 9, 2012, which is incorporated herein in its entirety. In one embodiment, once the tool 502 rotates such that a complete layer of pre-preg material 300 and backing 108 has encased the forming surfaces 520, 522 and 524 of the tool 502, the pre-preg material 300 and backing 108 are cut. The tool 502 then continues to rotate so that the forming head 508 presses all portions of the backing 108 and the pre-preg material 300 on the forming surfaces 520, 522 and 524 of the tool 502 while the backing 108, after contacting the forming head 508, is removed. Once all the backing 108 is removed, the process is repeated until the desired number of layers of pre-preg material 300 is formed. Once that occurs, the tool 502 with the formed layers of pre-preg material 300 are placed in an autoclave and cured.

Figure 6:
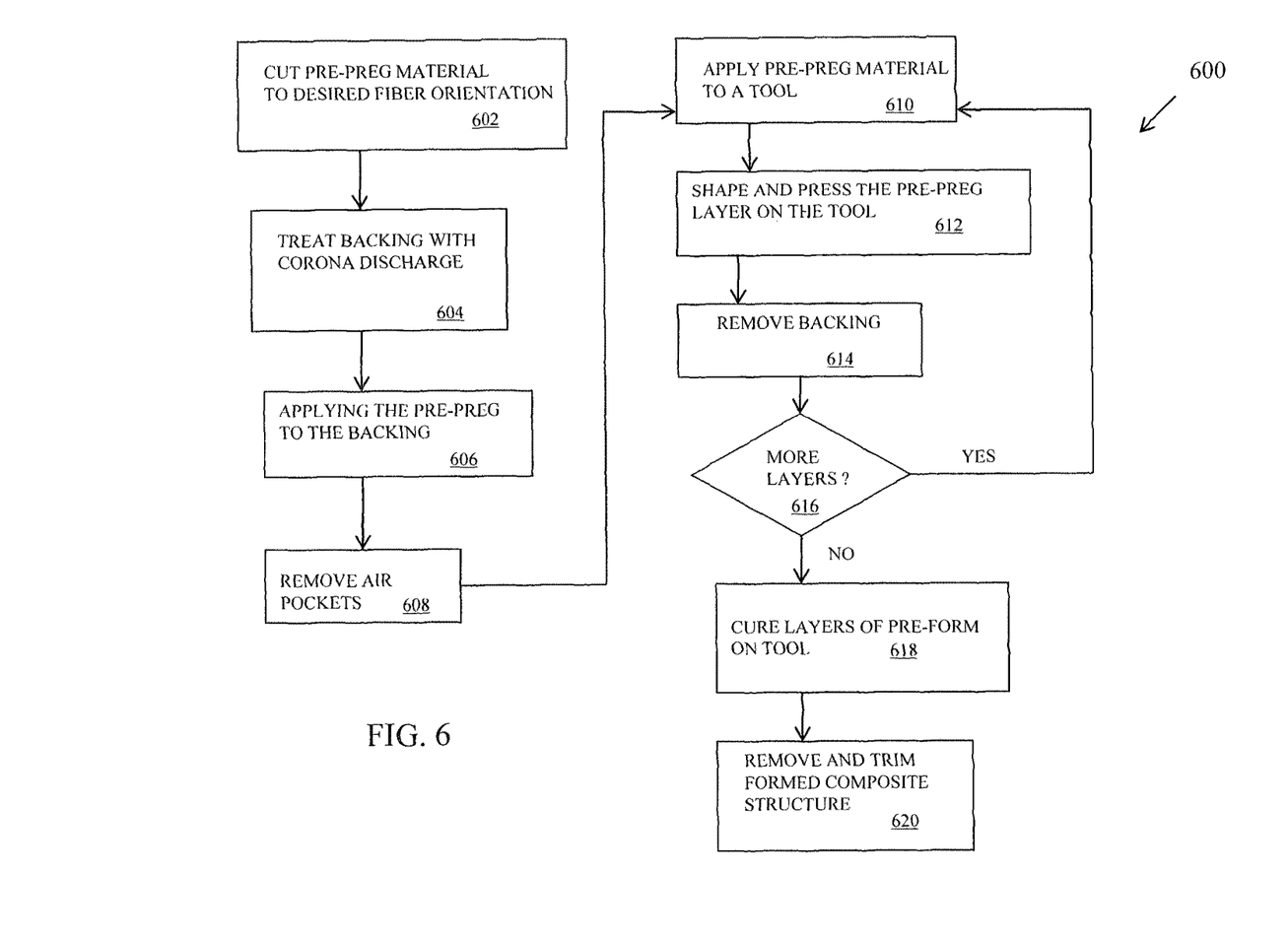
FIG. 6 is a formation flow diagram of one embodiment of the present invention.

FIG. 6 is a formation flow diagram 600 of an embodiment. In this embodiment, the process starts by cutting pre-preg material to a desired fiber orientation (602). The pre-preg material may be a uni-tape, woven fabric or the like. A side of a backing of a select material is then treated with corona discharge to increase its adhesion properties (604). As discussed above, a variety of different materials could be used for the backing. The pre-preg material having the desired fiber orientation is then applied to the treated surface of the backing (606). In one embodiment, air pockets between the pre-preg material and the backing are removed to increase adhesion (608). This step may not be needed in all situations. One method used to remove the air is with a squeegee as described. Another method is with a vacuum debulk system. In particular, a vacuum debulking assists in pressing the pre-preg material into the backing and in removing air between the pre-preg material and the backing to assist adhesion and performance when the pre-preg is applied to a tool. Once the pre-preg material is coupled to the backing, it can be stored on a roll until use as discussed above or applied to a tool right away.

In using the pre-preg material with corona discharge treated backing, the pre-preg material is applied to the forming surfaces of a tool (610). The pre-preg material and backing are then shaped and pressed into the forming surfaces of the tool to form the pre-preg material in a desired shape (612). In some embodiments heat is used to aid in the forming of the pre-preg material. Once the pre-preg material has been pressed into the desired shape, the backing is removed (614). It is then determined if additional layers of pre-preg material are needed to form the desired structure (616). If additional layers are needed (616), the process continues at (610). If no more layers are needed (616), the pre-preg material is cured (618). One method of curing the pre-preg material is with an autoclave. Once the pre-preg material has been cured, it is removed from the tool and trimmed to form a composite part (620).

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A method of forming a composite structure comprising:
applying sections of a feedstock comprising fibers and an adhesive material to a removable backing material to form a sheet of fiber-reinforced material having a desired fiber orientation relative to a side of the sheet of fiber-reinforced material, the desired fiber orientation comprising a non-zero degree angle fiber orientation;
applying the sheet of fiber-reinforced material having the desired fiber orientation to at least one surface of a tool to form a fiber-reinforced material having a desired shape while the removable backing material remains applied to the feedstock;
after applying the sheet of fiber-reinforced material having the desired fiber orientation to the at least one surface of the tool with the removable backing material remaining on the feedstock, subsequently removing the removable backing material from the fiber-reinforced material having the desired shape; and
curing the fiber-reinforced material having the desired shape.

2. The method of claim 1, wherein applying sections of a feedstock comprising fibers and an adhesive material to a removable backing material comprises applying the sections of the feedstock to at least one of a corona discharge treated backing material and a plasma treated backing material.

3. The method of claim 2, further comprising exposing the removable backing material to a surface energy level selected based on a material used as the removable backing material.

4. The method of claim 1, wherein applying sections of a feedstock comprising fibers and an adhesive material to a removable backing material comprises applying the sections of the feedstock to an activated surface of the removable backing material.

5. The method of claim 4, wherein applying the sections of the feedstock to an activated surface of a removable backing material comprises removing air between the sections of the feedstock and the removable backing material.

6. The method of claim 1, wherein applying the sheet of fiber-reinforced material having the desired fiber orientation to at least one surface of a tool to form a fiber-reinforced material having a desired shape while the removable backing material remains applied to the feedstock comprises stretching the sheet of fiber-reinforced material having the desired fiber orientation and the removable backing material over the tool.

7. The method of claim 1, further comprising applying additional sheets of fiber-reinforced material having the desired fiber orientation to form the fiber-reinforced material having the desired shape.

8. The method of claim 1, wherein the removable backing material is stretchable.

9. A method of forming a composite structure comprising:
positioning a sheet of fiber-reinforced material with a removable backing material on at least one forming surface of a tool, the sheet of fiber-reinforced material with the removable backing material comprising sections of a feedstock comprising fibers and having a fiber orientation relative to a side of the sheet of fiber-reinforced of a non-zero degree angle fiber orientation applied to a first surface of the removable backing material;
forcing the sheet of fiber-reinforced material with the removable backing material onto the at least one forming surface of the tool by pressing a second surface of the removable backing material to form the sheet of fiber-reinforced material with the removable backing material into a desired shape;
after forcing the sheet of fiber-reinforced material with the removable backing material onto the at least one forming surface of the tool with the removable backing material remaining on the feedstock, subsequently removing the removable backing material from the sheet of fiber-reinforced material after the sheet of fiber-reinforced material is shaped; and curing the sheet of fiber-reinforced material.

10. The method of claim 9, further comprising selecting the first surface of the removable backing material to exhibit an enhanced surface adhesiveness relative to the second surface of the removable backing material.

11. The method of claim 9, further comprising forcing another sheet of fiber-reinforced material onto the sheet of fiber-reinforced material on the at least one forming surface of the tool by pressing a second surface of another removable backing material of the another sheet of fiber-reinforced material to form the another sheet of fiber-reinforced material into the desired shape.

12. A method of forming a sheet of pre-preg material with a removable backing for a composite structure, the method comprising:

orienting a feedstock comprising a resin and fibers at a desired fiber orientation relative to a lateral side of a removable backing comprising a non-zero degree angle fiber orientation, the removable backing comprising oxygen molecules in atomic form bonded to molecules in the surface of the removable backing to exhibit an enhanced surface adhesion on the surface of the removable backing relative an opposing surface of the removable backing; and applying sections of the feedstock to a surface of the removable backing to form a sheet of pre-preg material including the fibers at the desired fiber orientation relative to the lateral side of the removable backing.

13. The method of claim 12, further comprising selecting the removable backing to exhibit an enhanced surface adhesion relative to an opposing surface of the removable backing.

14. The method of claim 1, further comprising bonding oxygen molecules in atomic form to molecules in a surface of the removable backing material to exhibit an enhanced surface adhesion on the surface of the removable backing material relative an opposing surface of the removable backing material.

15. The method of claim 1, wherein the sheet of fiber-reinforced material comprises a pre-preg material having the fibers held together with resin.

16. A method of forming a composite structure comprising:

applying sections of a feedstock comprising fibers and an adhesive material to a removable backing material to form a sheet of fiber-reinforced material having a desired fiber orientation relative to a side of the sheet of fiber-reinforced material, the desired fiber orientation comprising a non-zero degree angle fiber orientation;

applying the sheet of fiber-reinforced material having the desired fiber orientation to at least one surface of a tool to form a fiber-reinforced material having a desired shape while the removable backing material remains applied to the feedstock;

stretching the sheet of fiber-reinforced material including the removable backing material over the tool; and after applying the sheet of fiber-reinforced material having the desired fiber orientation to the at least one surface of the tool with the removable backing material remaining on the feedstock, subsequently removing the removable backing material from the fiber-reinforced material having the desired shape.

17. The method of claim 9, further comprising stretching the sheet of fiber-reinforced material including the removable backing material over the tool.

18. The method of claim 9, further comprising stretching the removable backing material over the tool.

19. The method of claim 9, further comprising selecting the sheet of fiber-reinforced material to comprise a dry fiber material.

* * * * *